June 5, 1973

D. C. TOSTESON 3,737,379

INSTANTANEOUS MEASUREMENT OF POTASSIUM AND OTHER SPECIFIC ION ACTIVITIES

Original Filed Dec. 20, 1967

INVENTOR.
Daniel C. Tosteson

BY
B. B. Olive
ATTORNEY

FIG. 5
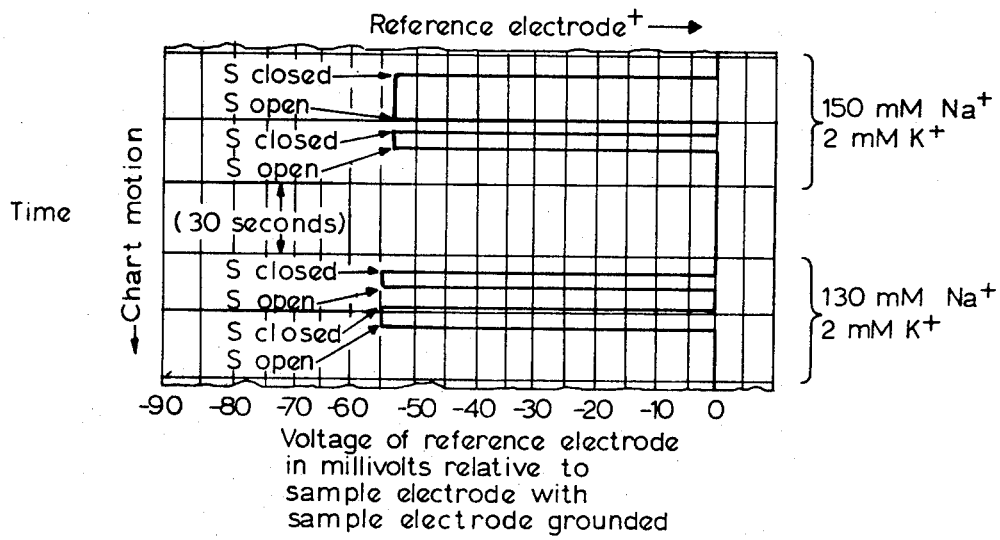
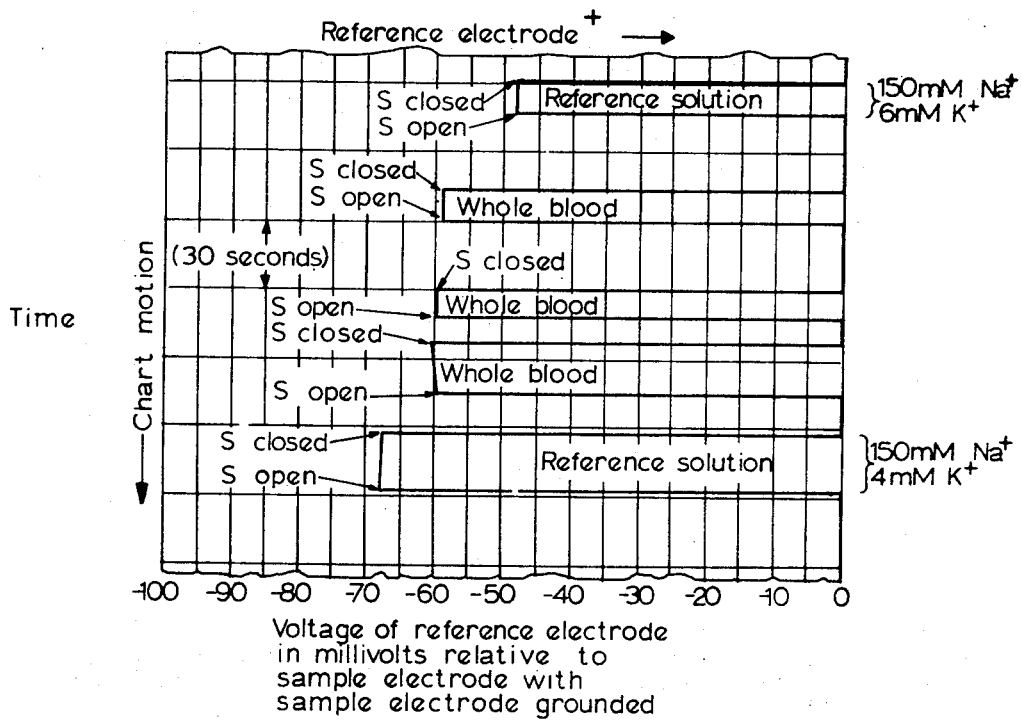
FIG. 7
INVENTOR.
Daniel C. Tosteson
BY
ATTORNEY

United States Patent Office 3,737,379
Patented June 5, 1973

3,737,379
INSTANTANEOUS MEASUREMENT OF POTASSIUM AND OTHER SPECIFIC ION ACTIVITIES
Daniel C. Tosteson, Chapel Hill, N.C., assignor to Duke University, Inc., Durham, N.C.
Original application Dec. 20, 1967, Ser. No. 692,065. Divided and this application Apr. 28, 1971, Ser. No. 138,220
Int. Cl. G01n 27/30, 27/40
U.S. Cl. 204—1 T     4 Claims

ABSTRACT OF THE DISCLOSURE

The direct and very rapid measurement of the activity of a particular chemical species of ion in an aqueous solution is achieved with an ion selective electrode embodying as the selective element a mechanically stable layer established between the aqueous solution and a non-aqueous phase, said layer being established by a surface active agent such as phospholipid, said layer also containing an ion selective macrocyclic compound such as valinomycin and said agent and macrocyclic compound being dissolved in a solvent which forms the non-aqueous phase. High selectivity for potassium ions, in particular, is achieved.

CROSS REFERENCE TO RELATED APPLICATIONS

This application constitutes a voluntary division of application Ser. No. 692,065 filed Dec. 20, 1967, now Pat. 3,607,700, entitled "Electrode for Measuring Potassium and other Specific Ion Activities."

BACKGROUND OF THE INVENTION

(1) Field of the invention

The invention may be said to relate broadly to the measurement of the activity of a particular chemical species of ion in an aqueous solution which also contains other species. More specifically, the invention relates to apparatus and associated compounds used to measure ion activity and sometimes referred to as ion electrodes, ion selective electrodes, ion activity electrodes, ion exchange membranes or electro-chemical cells. The subject matter of the invention encompasses both the physical structure of such electrodes as well as the compounds and membranes employed to establish the desired specific selectivity. The invention is uniquely applicable to the measurement of potassium ion activity.

(2) Description of the prior art

Various methods and apparatus have been employed for the measurement of ion activity. While the invention is recognized as being potentially applicable to the measurement of other ion activities, it is known to be particularly useful for the measurement of potassium ion activity. The discussion of the prior art practices is therefore limited to a discussion of prior art practices with respect to potassium ion activity. From such discussion it is believed that those skilled in the art will readily see the relation of the prior art to application of the invention to measurements of ionic activities other than potassium.

It has long been recognized that potassium ions play a vital role in many physiological processes. For example, the resting electrical potential difference (resting potential) between the inside and outside of most excitable cells (e.g. nerve cells; skeletal, smooth and cardiac muscle cells) is dependent on the facts that the potassium ion concentration is much higher in the intra-cellular than in the extra-cellular fluid and that the surface membrane of these cells when they are at rest is much more permeable to potassium than to other cations. Indeed, the magnitude of the resting potential in such cells has been shown to depend in large part on the ratio of intra-cellular to extra-cellular potassium ion concentration. Since excitability is, in turn, dependent on the magnitude of the resting potential, it is evident that small changes in the concentration of potassium ions in the extra-cellular fluid have profound effects on the activity of nerve and muscle cells. For example, an increase in the concentration of potassium ions in extra-cellular fluid (e.g. blood plasma) from the normal value of 4–5 mM. to 8–9 mM. can produce complete loss of excitability of cardiac muscle cells and thus cessation of the pumping action of the heart. For this and other important reasons knowledge of the concentration of potassium ions in blood plasma is of great importance to physicians in the management of many clinical disorders such as acute and chronic renal disease, endocrine diseases such as adrenal insufficiency and diabetes mellitus, disturbances of fluid balance produced by vomiting and diarrhea, circulatory shock, digitalis intoxication, etc. Therefore, the availability of a rapid, direct method for the measurement of potassium activity in biological fluids such as provided by this invention will be of great use not only in biological, physiological, biochemical and pharmacological research, but also in clinical medicine.

Potassium ion concentrations in biological and other aqueous fluids have been measured previously by precipitation methods and by flame emission and atomic absorption photometry. These procedures require considerable sample preparation and manipulation and are therefore time consuming. Furthermore, they measure the amount of potassium ion present in the sample rather than the activity of the ion in the solution analyzed. Attempts to formulate glass electrodes which are selective for potassium ions have been carried out in a number of laboratories. If they were sufficiently selective, these electrodes would permit rapid, direct determination of potassium ion activity. However, it has proved impossible to make glass electrodes with a selectivity ratio for potassium to sodium of greater than about 10 to 1. Since the concentration of sodium ions in human blood plasma is 30 times greater than the concentration of potassium ions, these glass electrodes are not suitable for measuring potassium ion activity in such fluids.

Within the past year, several laboratories have reported that certain macrocyclic compounds, e.g., valinomycin, enniatin B, nonactin, monoactin, dinactin, confer marked selectivity for potassium over sodium on thin (ca. $10^{-6}$ cm.) lipid bilayer membranes prepared from pure lecithin, mixed brain lipids, and sheep red cell lipids, The electrical potential difference across such thin membrane responds instantaneously to changes in the ratio of potassium ion concentrations in the aqueous phases bathing the two sides of the membrane. Nevertheless such thin bilayer membranes are not suitable for the practical measurement of potassium ion activities because of their extreme mechanical fragility. However, these investigations made clear the remarkable selectivity for potassium over sodium (as great as 1000 to 1) which certain macrocyclic compounds produce in thin bilayers of phospholipid. Also within the past year a report has appeared which describes attempts to make a potassium ion sensitive electrode by filling a sintered glass disc or other supporting medium with a solution of monoactin-dinactin in benzene or carbon tetrachloride. Such electrodes show striking selectivity for potassium over sodium ions but are extremely sluggish in response, requiring several hours to reach a steady potential after a change in the potassium ion activity in the test solution. These kinetic characteristics make electrodes of this type unsuitable for practical measurements of potassium ion activities.

SUMMARY OF THE INVENTION

The present invention represents an advance in the art of measuring the activity of potassium ions present in an aqueous solution together with other species of ions in several important respects. It is an improvement over precipitation and flame photometric methods in that it is rapid and direct and also in that it measures potassium ion activity rather than concentration. It is an advance over potassium selective glass electrodes in that it is much more selective for potassium ions and thus permits measurement of potassium ion activity in the presence of a large excess of sodium ions. It represents an advance over electrodes prepared by incorporating a solution of monactin-dinactin in benzene or chloroform into a sintered glass disc in that the response time is more than 100 times faster. Although the principles of operation of the present invention are similar to those operating in thin lipid bilayer membranes containing macrocyclic compounds, the present invention differs from such structures in that it provides a durable, mechanically stable, rugged system which is practicable for the measurement of potassium ion activities in aqueous solutions.

The invention is directed to ion selective electrodes which measure the activity of a particular chemical species of ion in an aqueous solution containing other species of ions, the operation of which is based on the principle that an electromotive force is developed at an interface established between the aqueous solution and a non-aqueous phase and being established by a surface active agent, said interface also containing an ion selective macrocyclic compound said agent and compound being dissolved in a solvent which forms the non-aqueous phase, the magnitude of said electromotive force being dependent on the activity of the ion being measured, a change in said electromotive force being developed rapidly after a change in the activity of the ion in the aqueous solution, said change in electromotive force being measured by conventional means involving reversible half cells and a high impedance potentiometer. More particularly, it has been discovered that an interface established by a surface active agent such as the phospholipid lecithin, said interface also containing an ion selective macrocyclic compound such as a cyclic depsi-peptide (e.g., valinomycin) or a cyclic ester (e.g., nonactin, monactin, dinactin), gives rise to an electromotive force the magnitude of which depends on the potassium ion activity in the aqueous solution bathing one side of said interface, said interface being located at the surface of contact between said aqueous solution and a non-aqueous, oil phase made up of a non-polar solvent such as decane in which the phospholipid and macrocyclic compound are dissolved.

An object of the invention is to provide an improved selective ion electrode suited particularly to measurement of potassium ($K^+$) ion activity.

Another object is to provide an ion electrode having mechanical ruggedness and a relatively fast and highly selective response to potassium ion activity in the presence of other ions, notably sodium and hydrogen ions.

Another object is to provide a new process for forming ion selective electrodes.

Another object is to provide a new membrane forming solution for ion selective electrodes.

The foregoing and other objects will appear from the description and drawings.

DESCRIPTION OF THE DRAWINGS

FIG. 5 is a potentiometric chart trace for sample solutions having potassium ion concentrations within the range of human blood and blood plasma.

FIG. 7 is a potentiometric chart trace for whole blood and comparable reference solutions.

DESCRIPTION OF THE PREFERRED EMBODIMENTS

Figure 1:
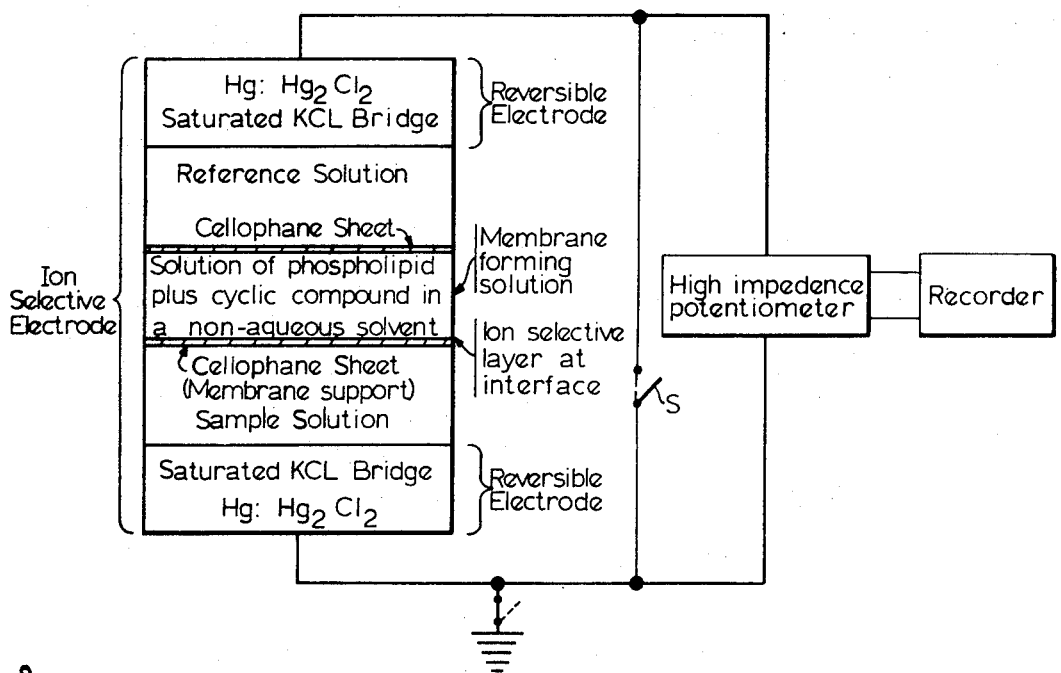
FIG. 1 is a schematic circuit diagram of an electrode measuring system embodying the invention.

In the embodiment of the invention illustrated by the circuit diagram of FIG. 1, the "electrode" of the invention may be seen to include two aqueous solutions separated by a lipid membrane forming solution consisting of a phospholipid and a macrocyclic compound dissolved in a non-aqueous phase. Electrical connections between the two aqueous solutions and the measuring instrument, a high impedance potentiometer are established through conventional reversible electrodes ($Hg:Hg_gCl_2$ or $Ag:AgCl$) having the usual KCl bridges. The two aqueous solutions comprise a reference solution whose ionic composition is maintained constant and a sample solution the potassium ion activity of which is to be measured. The lipid membrane forming solution to which the invention is primarily directed is, in this embodiment, confined between a pair of spaced cellophane membrane support sheets and consists of a solution of phospholipid and macrocyclic compound dissolved in a non-aqueous solvent e.g. decane, the chemical nature of the phospholipid, macrocyclic compound and solvent being later described. To complete the description of the general electrical diagram of FIG. 1, it will be noted that the reversible electrode in the sample solution which connects to one side of the potentiometer may or may not be connected to ground depending on the particular application and that the reversible electrode in the reefrence solution may be connected either to the other side of the potentiometer during measuring or to ground during non-measuring periods, a switch S being provided for this purpose.

Figure 2:
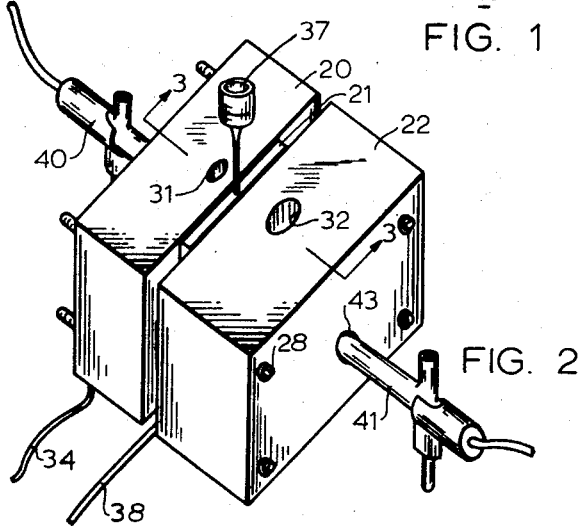
FIG. 2 is a perspective view of a chamber employed in the circuit of FIG. 1.
Figure 3:
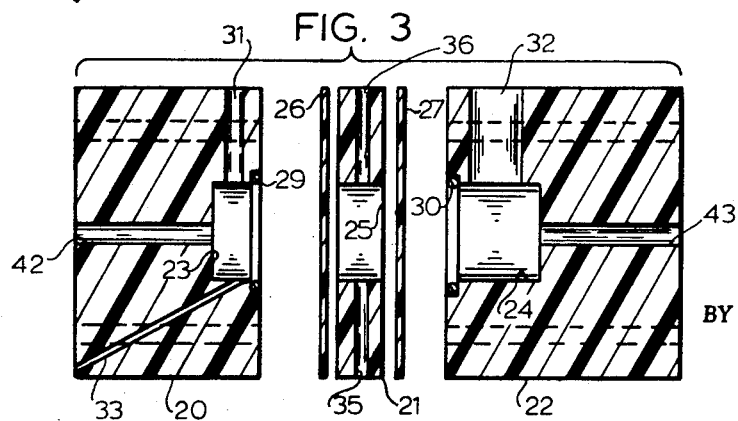
FIG. 3 is a section view of the chamber taken on line 3—3 of FIG. 2 and with the components separated.

A structure suitable to holding aqueous reference and sample solutions and the non-aqueous membrane forming solution is illustrated in FIGS. 2 and 3 in which the three block elements illustrated represent respectively three chamber blocks 20, 21, 22 which provide respectively, a chamber 23 for the sample solution, a chamber 24 for the reference solution and a chamber 25 for the phospholipidmacrocyclic compound-decane solution (hereafter called PMD solution) which establishes the desired ion selective membrane. Blocks 20, 21 and 22 may be made of various materials; while not limited to such materials it may be said generally that non-conducting, mechanically rugged plastic is suitable. In should be expected that satisfactory results will be obtained in most applications when block 21 is made of non-polar or hydrophobic material whereas blocks 20, 22 will generally operate whether made of polar e.g. glass or non-polar materials e.g. Lucite, Teflon, polyethylene or polypropylene. From the later description and examples, those skilled in the art will more readily appreciate the wide choice and controlling considerations in selecting materials for the block constructions.

The size of the chambers is essentially not critical and can be said to be determined primarily by the desired convenience in handling the solutions and by the tolerable electrical resistance of the overall system. The volume of each chamber is effectively established by two membrane support sheets 26, 27 which have been recognized as serving multifold purposes. Considering that ordinary porous cellophane sheet material is suited for such purposes it can be noted that membrane support 26 in particular stabilizes the ion selective membrane formed therein, that the membrane supports permit rapid access or contact between the aqueous and non-aqueous phases and in particular permit access of the potassium ions in the sample aqueous solution to the surface of the interface with the non-aqueous PMD solution, present a polar surface and, prevent access of macromolecules, e.g. proteins, and particles, e.g. red blood cells, to the surface of the non-aqueous phase. From the multifold purposes served it can be seen that various materials may be suited to fulfilling the requirements for membrane supports 26, 27 and that cellophane presents a simple and practical choice.

The three blocks are held tightly together by means of the bolts 28. The sample solution chamber 23 and reference solution chamber 24 are recessed to receive a pair of rubber O rings 29, 30 which assist in insuring a tight seal between the respective chambers and the two cellophane membrane supports. Passages 31, 32 provide access to the respective sample and reference chambers for the admission and removal of solutions. Where it is desired to vary the concentration of a particular sample solution as in the examples later described it is also found useful to provide a further passageway 33 having a connected tube 34. Access to the selectivity chamber 25 is provided by a lower passageway 35 and an upper passageway 36, the upper passageway 36 receiving a needle 37 and the lower passageway receiving a connecting tube 38. The conventional reversible electrodes 40, 41 mount in corresponding passages 42, 43. The reversible electrodes 40, 41 may be mounted in the sides or at an angle and may be made easily removable such that the passageways 42, 43 may also serve as a means of gaining access to the chambers.

It should of course be understood that the invention may be employed in applications where both the PMD and reference solutions are to remain constant. In such applications the PMD and reference solutions may be installed by any suitable means and sealed and in a manner not requiring the particular passageways illustrated. The entire assembly shown in FIGS. 2 and 3 may be oriented differently, say turned 90 degrees, and operate equally effectively. From one of the examples to follow it will also be seen that the results of the invention may be achieved by employing only one sheet membrane support, the pores of which contain the PMD solution, clamped between blocks 20 and 22 and not using block 21 or a PMD solution chamber as such.

EXAMPLE I

An electrochemical cell was built and operated according to FIGS. 1, 2 and 3. Blocks 20 and 22 were made of Lucite and block 21 was made of Teflon. All chambers were cylindrical in shape and the interface area between chambers was approximately 0.75 cm.$^2$ and the length of the PMD solution chamber 25 was approximately 3 mm. Membrane supports 26 and 27 were formed of Union Carbide Corporation's cellophane dialysis tubing.

The reversible electrodes were calomel electrodes with KCl bridges and were of the standard Beckman fiber-junction type. A Varian potentiometric recorder was employed and was connected through a zero gain, impedance matching preamplifier, Keithly Model 300, having a nominal input impedance of $10^{13}$ ohms. Of particular importance to the invention was the non-aqueous PMD solution, which was placed in the chamber 25 which in this example was made by dissolving crude soybean lecithin (Centrolex C. Lecithin, Central Soya Company) in n-decane to give a final concentration of 30 mgm. lecithin/ml. Monactin (67%) dinactin (33%) (supplied by the Squibb Research Institute) was added to the phospholipid-decane solution to give a final concentration of 0.3 mgm. of the macrocyclic ester per ml. Both the aqueous sample and reference solutions were unbuffered with a pH of 5.5 to 6.0. The K$^+$ concentration in the reference solution was 0.01 M. while the sample solutions contained different concentrations of Na$^+$ and K$^+$ within the range of those observed in human blood plasma. The electrical resistance of the lipid membrane of the invention was measured and found to be approximately $10^7$ ohms it being noted that the resistance across the whole circuit of FIG. 1 can be shown to be substantially equal to the resistance of the PMD solution between the membrane supports. Table I below shows the results obtained with three different potassium concentrations in the sample solution. Note that the voltage measured was independent of the sodium concentration at any given potassium concentration. This example illustrates the feasibility of measuring K$^+$ ion activity in solutions similar to human blood plasma and in which there is contained a large and varying excess of sodium ions.

TABLE I.—SUMMARY OF MEASUREMENTS OF POTASSIUM ACTIVITY IN SOLUTIONS SIMILAR TO HUMAN BLOOD AREA

| Reference solution: 0.01 MKCl | | Temperature: 22° C. |
|---|---|---|
| Sample solution, mM: | | Membrane voltage (Sample solution grounded), mV. |
| (Na) | (K) | |
| 150 | 2.0 | −55 |
| 140 | 2.0 | −55 |
| 130 | 2.0 | −55 |
| 150 | 4.0 | −41 |
| 140 | 4.0 | −42 |
| 130 | 4.0 | −41 |
| 150 | 6.0 | −33 |
| 140 | 6.0 | −33 |
| 130 | 6.0 | −33 |

Figure 4:
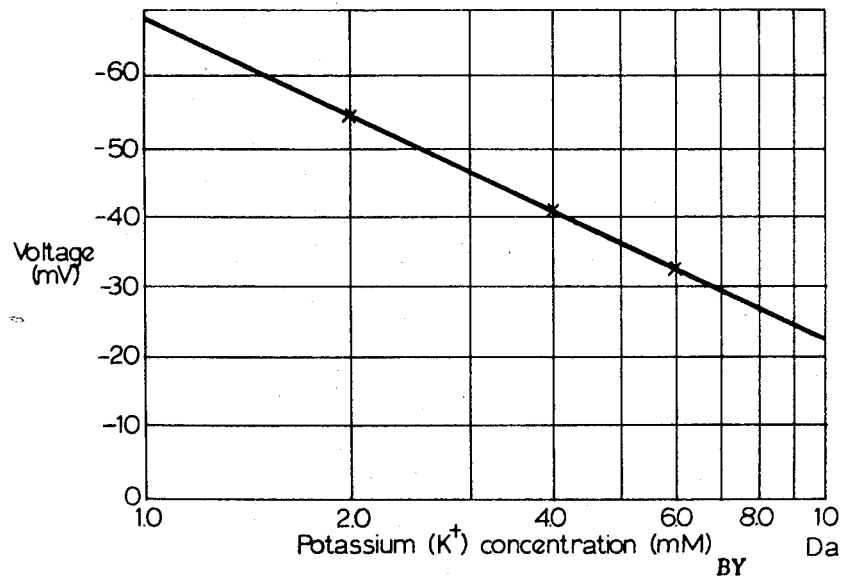
FIG. 4 is a potassium ion concentration-voltage curve for sample solutions having potassium ion concentrations within the range of human blood and blood plasma.

FIG. 4 shows a semi-log plot of the data shown in Table 1 above. From this it is evident that the voltage was directly proportional to the logarithm of the potassium ion concentration in the sample solution. The slope of the line shown in FIG. 4 was 46 mv. for a 10 fold change in potassium ion concentration. The reason for the difference between this slope and the slope of 55 mv. theoretically expected for a perfect potassium electrode is not at present clear. However, since the slope shown in FIG. 4 was consistently reproducible and independent of the potassium and sodium ion concentrations, this deviation from theoretical ideal behavior in no way precludes use of the system of the invention for measurement of potassium ion activity.

FIG. 5 is a typical chart trace of a record produced by the potentiometric recorder during the measurements referred to in Table I and FIG. 4. FIG. 5 shows that a steady voltage was developed substantially instantaneously, within the one second response time of the recorder, after opening of a grounding switch S (FIG. 1) connected to the reference solution electrode. FIG. 5 also shows that the voltage developed was reproducible and independent of the sodium concentration.

EXAMPLE II

The conditions of Example 1 were repeated except that the final concentration of monactin-dinactin was only 0.003 mgm./ml. Substantially the same results were obtained.

EXAMPLE III

The conditions of Example 1 were repeated except that the monactin was replaced with valinomycin with no change in results.

EXAMPLE IV

Figure 6:
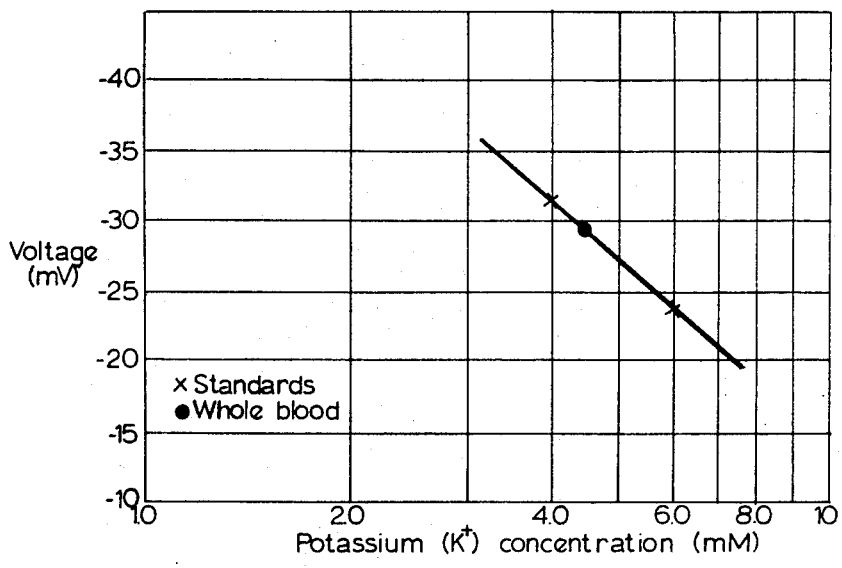
FIG. 6 is a potassium ion concentration-voltage curve for whole human blood.

The electrical arrangement of Example 1 was used to measure samples of human blood plasma and whole human blood. These measurements were made by comparing the voltage developed in the presence of the unknown blood and blood plasma samples with voltage developed by samples containing known concentrations of potassium (K$^+$) ions as shown in FIG. 6. The results of these measurements are summarized in Table II below which shows that the potassium ion concentrations are within the normal range and that identical results were obtained with plasma and whole blood. Thus, the presence of the formed elements of the blood e.g. red cells, white cells etc. did not affect the results.

TABLE II

Measurement of $K^+$ concentration in human blood and plasma $K^+$ concentration

| | mM. |
|---|---|
| Whole blood | 4.4 |
| Plasma | 4.4 |

FIG. 7 shows a trace made by the potentiometric recorder during the measurements summarized in Table II and FIG. 6. Note that the rapidity of response and reproducibility were as satisfactory with whole blood as they were with the standard solutions which contained no protein or blood cells. This example thus indicates the feasibility of direct measurement of plasma potassium ion activity in unprocessed samples of whole human blood either in vitro or with other embodiments in vivo.

EXAMPLE V

The conditions of Example 1 were repeated except that the portion of the electrode system previously formed by the cellophane membrane supports 26, 27, the block 21 and the described membrane forming PMD solution was instead formed by soaking a sheet of Millipore filter paper (HA, nominal pore diameter $0.45_\mu$) in the PMD solution described in Example 1 and this single sheet of soaked filter paper was clamped between the two blocks 20, 22. It should be noted that this single sheet provided support for the interface and stored the non-aqueous phase provided by the PMD solution. No substantial difference in results was noticed from those previously set forth in Example 1.

OTHER EXAMPLES

In addition to the above examples, a large number of cyclic and linear peptide and depsi peptide anti-biotics were tested for ionic selectivity. Macrocyclic compounds which were found to be satisfactory for the production of a practical, useful potassium ion selective electrode were the monactin series which includes nonactin, monactin, dinactin and trinactin, valinomycin and analogs having its ion selective character and enniatin B. Examples of compounds which showed inadequate selectivity included macrocyclic antibiotics, polymixin B, subtilin, streptogramin, viridogrisein, vernamycin, bacitracin, and gramicidin S; the linear peptide antibiotics gramicidin A, B, and C; the macrocyclic peptide mushroom poisons amanitin and phalloidin; and several linear and cyclic synthetic hexapeptides. The reasons for the ineffectiveness of these last mentioned compounds are not clear but are believed to involve the size of the ring, the presence of charged groups on the side chains and inadequate lipid solubility. Other phospholipids that are deemed operable include cephalins (phosphatidyl serine and phosphatidyl ethanolamine) and sphingomyelin. Other solvents that are useful to the invention include bromobenzene though here it will be readily understood by those skilled in the art that a wide range of workable solvents are available given the discovery and parameters set forth by the invention.

The mechanism by which macrocyclic compounds produce a high degree of selectivity of $K^+$ over $Na^+$ in thin and thick artificial lipid as well as intact red cell membranes is at present unclear. My working hypothesis is that the compounds exert their effects on a monolayer of phospholipid which is assumed to exist at the interface between the lipid i.e. non-aqueous and aqueous phases of these systems. It is also recognized that in the membrane forming and selectivity solution of the invention the phospholipid provides an anionic detergent having a strong polar end and a strong nonpolar end, that the n-decane provides a non-polar, non-aqueous, hydrophobic, solvent and that the macrocyclic compound provides a lipid soluble compound which selectively enhances permeability to $K^+$ ions. Stated somewhat differently, the invention recognizes that the presence of what appears to be a monolayer of a surface active agent containing a macrocyclic compound when acting to separate an aqueous solution containing a potassium ion activity to be measured from a non-aqueous, hydrophobic solution will when suitably mechanically stabilized also act to provide a highly selective, rapidly responsive and rugged membrane. In whatever form the invention is employed it can be seen that the art is now provided with a rugged, reliable and extremely quick process and apparatus for measuring potassium ion activity.

In the examples, it should also be noted that in the quantities and conditions stated, the solvent constitutes a major portion of the electrode forming solution, that the phospholipid agent constitutes a minor non-saturating portion and that the macrocyclic compound constitutes a minor non-saturating portion. Therefore, it can be accurately said that not only is the solvent-agent-compound soluiton a novel solution is combination but it is particularly novel in the portions stated and is dramatically unique in giving the long desired characteristics in the same solution of both comparatively immediate readings and mechanical stability.

What is claimed is:

1. In a system for measuring the activity of selected ions in an aqueous solution having both the selected ions and other ions, the combination of:
   (a) a container of non-conductive material for holding said aqueous solution;
   (b) a selective electrode membrane forming solution containing in a major portion a non-aqueous hydrophobic solvent and in minor non-saturating portions both a surface active phospholipid agent and a macrocyclic compound, said macrocyclic compound being selected from the group consisting of the monactin series consisting of nonactin, monactin, dinactin, trinactin, enniatin B and valinomycin, said portions of said solvent, agent and compound being selected such that said membrane forming solution when placed in contact with said aqueous solution forms a thick lipid membrane characterized by having a thickness of greater than $10^{-6}$ centimeters, being adapted to mechanical stabilization over a prolonged period of time, being highly selective, being rapidly responsive, said membrane being further characterized by consisting of an interface in contact with and a bulk phase out of contact with said aqueous solution, said interface containing both said agent and macrocyclic compound and, independent of any of said compound being added to said aqueous solution, developing across itself a measurable voltage as a function of the activity of the selected ions in said aqueous solution with changes in said voltage occurring in substantially immediate response to changes in said activity, the selective character of said interface being dependent on the presence of said compound in said minor non-saturating portion and the speed of response character of said interface being dependent on the presence of said agent in said minor non-saturating portion, and said interface and bulk phase collectively exhibiting sufficiently low electrical resistance to permit rapid measurement of said voltage by the taking of such measurement across both said interface and bulk phase;
   (c) support means effective to retain said membrane solution, establish and mechanically stabilize said interface and bulk phase; and
   (d) voltage measuring means arranged to substantially instantaneously respond to and measure said voltage as a function of said activity.

2. In a system as claimed in 1 wherein said selected ions are potassium ions.

3. A process of selectively and substantially instantaneously measuring selected ion activity in a bulk aqueous phase having both the ions whose activity is to be measured and other ions comprising:
  (a) providing a porous support sheet located such that one side thereof is bathed by said aqueous phase and the opposite side is isolated therefrom;
  (b) bathing the said opposite side of the support sheet with a non-aqeuous electrode membrane forming solution which comprises essentially in a major portion a non-aqueous hydrophobic solvent containing in minor non-saturating portions both a phospholipid surface active agent and a macrocyclic compound selected from the group consisting of nonactin, monactin, dinactin, trinactin, enniatin B and valinomycin, said portions of said solvent, agent and compound being selected such that said membrane forming solution when placed in contact with said aqueous solution forms a thick lipid member characterized by having a thickness greater than $10^{-6}$ centimeters, being adapted to mechanical stabilization over a prolonged period of time, being highly selective, being rapidly responsive, said membrane being further characterized by consisting of an interface in contact with and a bulk phase out of contact with said aqueous solution, said interface containing both said agent and macrocyclic compound and, independent of any of said compound being added to said aqueous solution, developing across itself a measurable voltage as a function of the activity of the selected ions in said aqueous solution with changes in said voltage occurring in substantially instantaneous response to change in said activity, the selective character of said interface being dependent on the presence of said compound in said minor non-saturating portion and the speed of response character of said interface being dependent on the presence of said agent in said minor non-saturating portion, and said interface and bulk phase collectively exhibiting sufficiently low electrical resistance to permit rapid measurement of said voltage by the taking of such measurement across both said interface and bulk phase;
  (c) contacting said aqueous and non-aqueous phases with appropriate voltage measuring means adapted to measure said interface voltage by measuring across both said interface and bulk phase; and
  (d) substantially instantaneously determining the voltage developed across said interface as a measure of the selected ion activity in said aqueous phase.

4. The process of claim 3 wherein said selected ions are potassium ions.

References Cited
UNITED STATES PATENTS 3,429,785    2/1969    Ross _____ 204—1 T

OTHER REFERENCES

Paul Mueller et al., Biochemical and Biophysical Research Communications, vol. 26, No. 4, pp. 398–404 (1967).

Paul Mueller et al., Journal of Physical Chemistry, vol. 67, pp. 534–535 (1963).

A. A. Lev et al., Tsitologiya, vol. 9, No. 1, pp. 102–106 (1967).

Stefanac et al., Microchemical Journal, vol. 12, pp. 125–132 (1967).

GERALD L. KAPLAN, Primary Examiner

U.S. Cl. X.R.

204—195 L